(12) United States Patent
Viglione et al.

(10) Patent No.: US 6,651,192 B1
(45) Date of Patent: Nov. 18, 2003

(54) METHOD AND SYSTEM FOR TESTING RELIABILITY ATTRIBUTES IN DISK DRIVES

(75) Inventors: Joseph M. Viglione, Laguna Hills, CA (US); Yvonne M. Utzig, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 551 days.

(21) Appl. No.: 09/728,545

(22) Filed: Nov. 30, 2000

(51) Int. Cl.[7] .............................................. G06F 11/00
(52) U.S. Cl. ............................ 714/47; 714/42; 360/25; 702/115; 702/182
(58) Field of Search ............................ 714/47, 42, 25; 702/115, 182, 117; 360/1–130; 369/53.37, 43, 53.1

(56) References Cited

U.S. PATENT DOCUMENTS

| | | | | |
|---|---|---|---|---|
| 5,253,131 A | * | 10/1993 | Chevalier | 360/78.14 |
| 6,026,352 A | * | 2/2000 | Burns et al. | 702/182 |
| 6,281,676 B1 | * | 8/2001 | Ottesen et al. | 324/212 |
| 6,282,501 B1 | * | 8/2001 | Assouad | 702/117 |
| 6,408,406 B1 | * | 6/2002 | Parris | 714/41 |

* cited by examiner

Primary Examiner—Scott Baderman
Assistant Examiner—Timothy M. Bonura
(74) Attorney, Agent, or Firm—Milad G. Shara, Esq.; Ivan Posey, Esq.

(57) ABSTRACT

A system and method for manufacturing disk drives, the disk drives having reliability attributes and manufacturing attributes, the manufacturing attributes comprising process or component manufacturing attributes is disclosed. The reliability attributes comprise measurements for predicting future reliability of the disk drives at the time of manufacture. The disk drives are prepared with a servo format. Each disk drive is connected to a test apparatus and then tuned to verify that each disk drive performs within expected limits. One or more technical screen tests are performed on all of the disk drives. A first sample set of the disk drives is selected automatically at a defined size using a randomizer. One or more extended tests are executed on the first sample set of disk drives to measure a margin magnitude for one or more of the reliability attributes. The margin magnitude is compared with a reference to detect a significant change. If a significant change in the margin magnitude from the reference is detected, then the defined sample size is adjusted. A second sample set of the disk drives is selected according to the adjusted sample size using the randomizer. The extended tests are then repeated on the second sample set to validate the significant change.

11 Claims, 2 Drawing Sheets

METHOD AND SYSTEM FOR TESTING RELIABILITY ATTRIBUTES IN DISK DRIVES

BACKGROUND OF THE INVENTION

1. Field of the Invention

A method and system for testing reliability attributes in disk drives is disclosed. More specifically, the invention is a method and system for testing reliability attributes in disk drives based on margin magnitudes measured in a subset of the disk drives, the margin magnitudes indicating reliability for the population, or lot, of the disk drives.

2. Description of the Prior Art and Related Information

Companies in the field of hard disk drive manufacturing have recently seen an increase in pressure to lower costs. This pressure may be the result of lower profit margins per megabyte of storage, and increased competition in the market place.

As profit margins lower, manufacturers must increase manufacturing volume. With the increase in volume, there is at least a corresponding increase in costs in the factory where the hard disk drives are assembled.

Automated processes have helped to lower costs. For example, one process comprises writing a servo pattern on the magnetic media of the disk drive. Most manufacturers have employed large capacity servo formatters which can simultaneously connect to multiple disk drive assemblies to write the critical servo burst information that is used to position the read-write head of the a disk drive during operation.

A test apparatus is employed which is simultaneously connectable to multiple disk drive assemblies using multiple disk drive interfaces so that calibration, or tuning, processes and testing may be performed on the multiple disk drives at the same time. Such tests include tuning tests, optimization tests, and defect detection tests. The disk drives are formatted and may have customer specific product overlays installed while connected to the test apparatus.

Many of the tests that are performed on the disk drives are relatively time consuming. For example, some tests comprise on-going reliability tests (ORTs) which may comprise, complete multi-corner environmental stress tests used to ensure that the disk drives will operate reliably beyond the warranty life. Basic environmental stress tests may take 72 hours to complete. Another test includes a corrosion test suite which tests various corrosive properties of a disk drive by altering the environment in a chamber in which the disk drive is tested.

SUMMARY OF THE INVENTION

A system for testing reliability attributes in disk drives is disclosed. The reliability for the disk drives may be characterized as reliability attributes comprising measurements for predicting future reliability of the disk drives at the time of manufacture. The disk drives have reliability attributes and manufacturing attributes. The manufacturing attributes comprise process or component manufacturing attributes, which contribute to the reliability attributes of the disk drives.

The system comprises a servo formatter for preparing each disk drive with a servo format. A test apparatus is provided, to which each disk drive is connectable. The test apparatus includes one or more processors, and interfaces for connecting each disk drive to the test apparatus. Each of the disk drives comprises one or more processors which are capable of executing test instructions downloaded to the disk drives through the interfaces.

The test apparatus has a calibrator for tuning each disk drive connected to the test apparatus for verifying that each disk drive performs within expected limits. The calibrator may comprise software that executes on the processor of the test apparatus, and software that is downloaded to the disk drives for execution on processors of the disk drives. The tuning of the disk drives may include optimizing the disk drives for specific end uses. For example, tuning may comprise characterizing the gain component and frequency response of the read/write head of each disk drive. The electronics of each disk drive are thus tuned to conform with the individual head-media interface characteristics which vary from drive to drive.

A test containment logic may further be included with the calibrator for performing, or causing to be performed, one or more technical screen tests on each disk drive.

A work flow system is included, such as an integrated test system described in application Ser. No. 08/873,230 entitled "METHOD FOR MANUFACTURING A DISK DRIVE" filed Apr. 3, 2000, the full disclosure of which is incorporated by reference herein. The work flow system is connected to a network that is connected to the test apparatus through a network interface. The network may be connected to a plurality of test apparatuses which communicate with the work flow system through the network. A randomizer for automatically selecting a first sample set of the disk drives is provided with the work flow system. The randomizer may comprise a software module that executes on a processor of the work flow system that randomly selects the disk drives to be included in the first sample set. The first sample set has a size programmed into the randomizer for defining the size of the first sample set, which may be distributed across more than one test apparatus. The work flow system communicates with the test apparatus to define which disk drives connected to the test apparatus should be included in the first sample set.

An extended testing logic is included with the test apparatus for executing one or more extended tests on the first sample set of disk drives for measuring a margin magnitude for one or more of the reliability attributes. The extended testing logic comprises a software module for execution on the processors of the selected disk drives in the sample set, and may include some instructions which execute on the processor of the test apparatus. The margin magnitude is used as a predictor of reliability for the disk drives wherein a higher performance level suggests a high reliability and a low performance level suggests a low reliability. For example, a disk drive having a high mean number of seek operations between errors may tend to have a high reliability.

The extended testing logic retrieves a reference for the margin magnitude and detects a significant change in the margin magnitude from the reference. The reference may be calculated by, for example, averaging the margin magnitude for each extended test performed over time. The reference may alternatively be determined by selecting and specifying a minimum performance parameter based on general manufacturing experience among engineers for predicting hard disk drive reliability.

When compared with the reference, if a significant change is detected in the margin magnitude from the reference by one or more of the extended tests, the extended testing logic sends a request to the work flow system to automatically adjust the defined sample size to use for the size of a second sample set of the disk drives. The randomizer is further adapted to automatically select the second sample set to be communicated to the test apparatuses. The second sample set has the newly adjusted defined size. The extended testing logic is further adapted to repeat the extended tests on the second sample set to validate the significant change that was detected with respect to the first sample set.

DETAILED DESCRIPTION OF THE PREFERRED EMBODIMENTS

Figure 1:
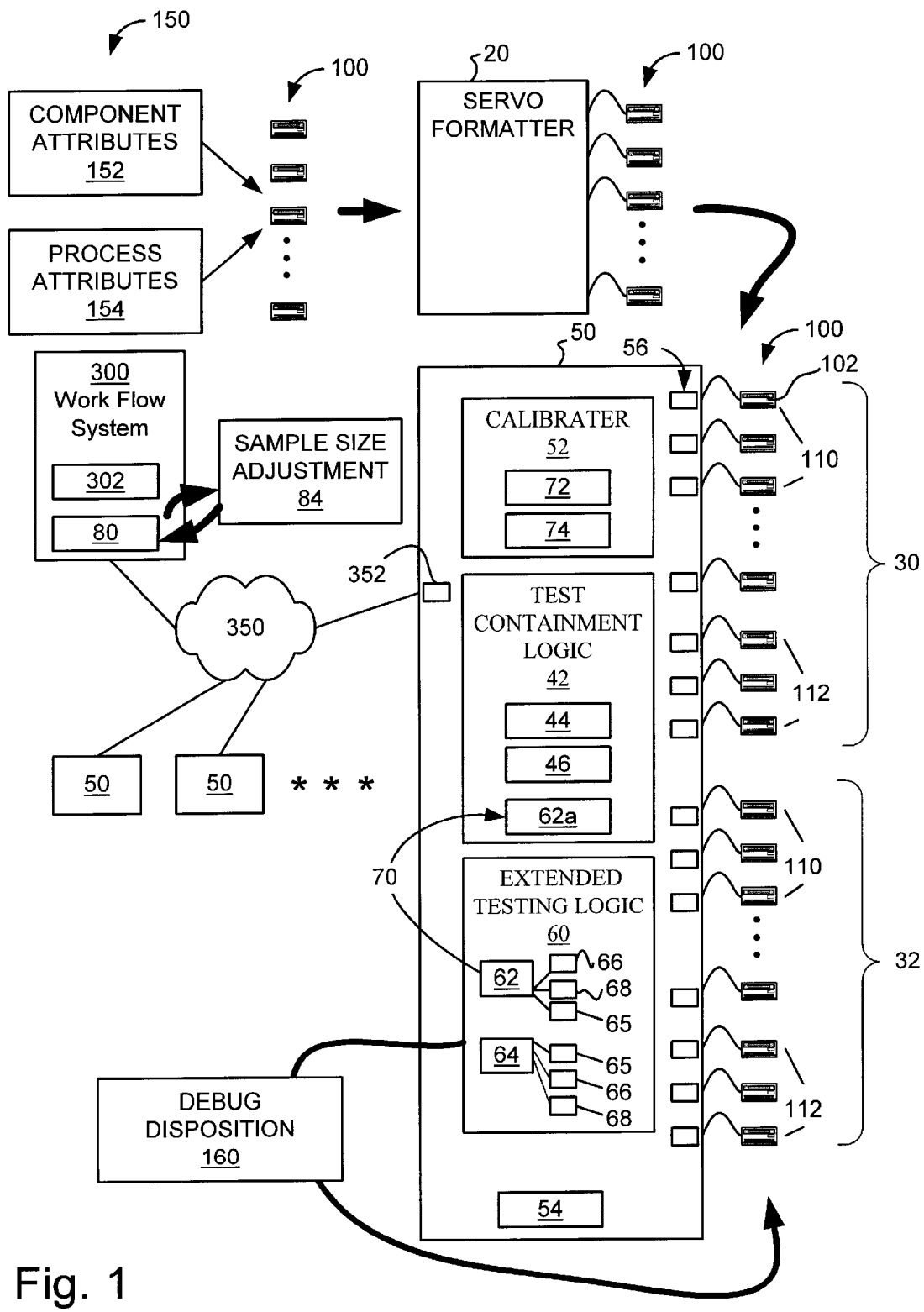
FIG. 1 is block diagram illustrating a system for testing reliability attributes in disk drives.

With reference to FIG. 1, a system for testing reliability attributes in disk drives 100 is shown. The reliability for the disk drives 100 may be characterized as reliability attributes comprising measurements for predicting future reliability of the disk drives 100 at the time of manufacture. The disk drives 100 have manufacturing attributes 150 comprising component or process manufacturing attributes 152 and 154, which contribute to the reliability attributes of the disk drives 100.

The system comprises a servo formatter 20 for preparing each disk drive 100 with a servo format. A test apparatus 50 is provided, to which each disk drive 100 is connectable. The test apparatus 50 includes one or more processors 54, and interfaces 56 for connecting each disk drive 100 to the test apparatus 50. Each of the disk drives 100 includes a processor 102 therein that can execute software instructions for the purposes of tuning and performing tests.

The test apparatus 50 has a calibrator 52 for tuning each disk drive 100 connected to the test apparatus 50 for verifying that each disk drive 100 performs within expected limits. The calibrator 52 may comprise software that executes on the processor 54 of the test apparatus 50 or on the disk drive's processor 102 for tuning the disk drives 100. Tuning of the disk drives 100 may include optimizing the disk drives 100 for specific end uses.

The test apparatus 50 includes a test containment logic 42 for performing one or more technical screen tests 44, 46 on each disk drive 100. The technical screen tests 44, 46 comprise one or more software modules that are executed either on the disk drive's processor 102 or on the processor 54 of the test apparatus. The technical screen tests 44, 46 are performed on 100% of the disk drives 100 before they are released, or entitled, from manufacturing.

A work flow system 300 is included, such as an integrated test system described in application Ser. No. 08/873,230 entitled "METHOD FOR MANUFACTURING A DISK DRIVE" filed Apr. 3, 2000, the full disclosure of which is incorporated by reference herein. The work flow system 300 is connected to a network 350 that is connected to the test apparatus 50 through a network interface 352. The network 350 may be connected to a plurality of test apparatuses 50 which communicate with the work flow system 300 through the network 350. A randomizer 80 for automatically selecting a first sample set 110 of the disk drives 100 is provided with the work flow system 300. The randomizer 80 comprises a software module that executes on a processor 302 of the work flow system 300 and randomly selects the disk drives 100 to be included in the first sample set 110. The first sample set 110 has a size programmed into the randomizer 80 for defining the size of the first sample set 110, and the work flow system 300 communicates to the test apparatuses 50 which disk drives 100 should be included in the first sample set 110.

An extended testing logic 60 is included with the test apparatus 50 for executing one or more extended tests 62–64 on the first sample set 110 of disk drives 100 for measuring a margin magnitude 65 for one or more of the reliability attributes. The extended testing logic 60 may comprise a software module for execution on the processor 54 of the test apparatus 50, or on the processor 102 of each disk drive 100 in the first sample set 110. The margin magnitude 65 is defined as a performance level above that for minimal operation, or reference 66, of a disk drive 100. The margin magnitude 65 is used as a predictor of reliability for the disk drives 100 wherein a higher performance level suggests a high reliability and a low performance level suggests a low reliability. For example, a disk drive 100 having a high mean number of seek operations between errors may tend to have a high reliability.

The extended testing logic 60 is for retrieving a reference 66 for comparing to the margin magnitude 65 and detecting a significant change 68 in the margin magnitude 65 from the reference 66. The reference 66 may be calculated by, for example, averaging the margin magnitude 65 above a minimum performance value for each extended test 62–64 performed over time, i.e. by averaging historical margin magnitude data. The reference 66 may alternatively be determined by selecting and specifying a minimum performance parameter based on general manufacturing experience among engineers for predicting hard disk drive reliability, and selecting a margin magnitude that should be reached for the extended test. When compared with the reference margin magnitude 66, if a significant change 68 is detected in the margin magnitude 65 for one or more of the extended tests 62–64, the extended testing logic 60 automatically sends a request to the work flow system 300 to adjust the sample size from that of the first sample set 110. The adjusted sample size is used to define the size of a second sample set 112 of the disk drives 100 in response to the significant change 68 (the adjustment is shown at 84). The randomizer 80 is further adapted to automatically select the second sample set 112. The second sample set 112 has the newly adjusted defined size. The extended testing logic 60 is further adapted to receive data from the work flow system 300 regarding which disk drives should be included in the second sample set in order to repeat the extended tests 62–64 on the second sample set 112 to validate the significant change 68 that was detected with respect to the first sample set 110.

For the one or more extended tests 62 that detected and validated the significant change 68 in one or more margin magnitudes 65, the test containment logic 42 is adapted to incorporate that one or more of the extended tests 62a, as shown by line 70. In this way, the extended test 62a is incorporated with the technical screen tests 44, 46, and thus becomes one of said technical screen tests 44, 46, 62a. This incorporation may be accomplished by either providing the test containment logic 42 with a pointer to an object that comprises the extended test 62, or the extending testing logic 60 may provide the executable instructions for the extended test 62 to the test containment logic 42 for the new technical screen test 62a.

The extended testing logic 60 may detect the significant changes 68 by detecting whether a margin magnitude 65 for the one or more reliability attributes measures outside a numeric range from the reference 66 for a selected reliability attribute. In this case, the selected reliability attribute comprises a numeric value for performance of the disk drives 100 at time of manufacture.

The extended testing logic 60 may provide a debug disposition 160 depending from the reliability attribute for which a significant change 68 was detected and validated. The debug disposition 160 comprises data suggesting that one or more manufacturing attributes 150 should be changed. For example, the debug disposition 160 may comprise data indicating that a component showing low performance should be changed before the disk drives 100 are shipped to OEMs or retail stores.

Figure 2:
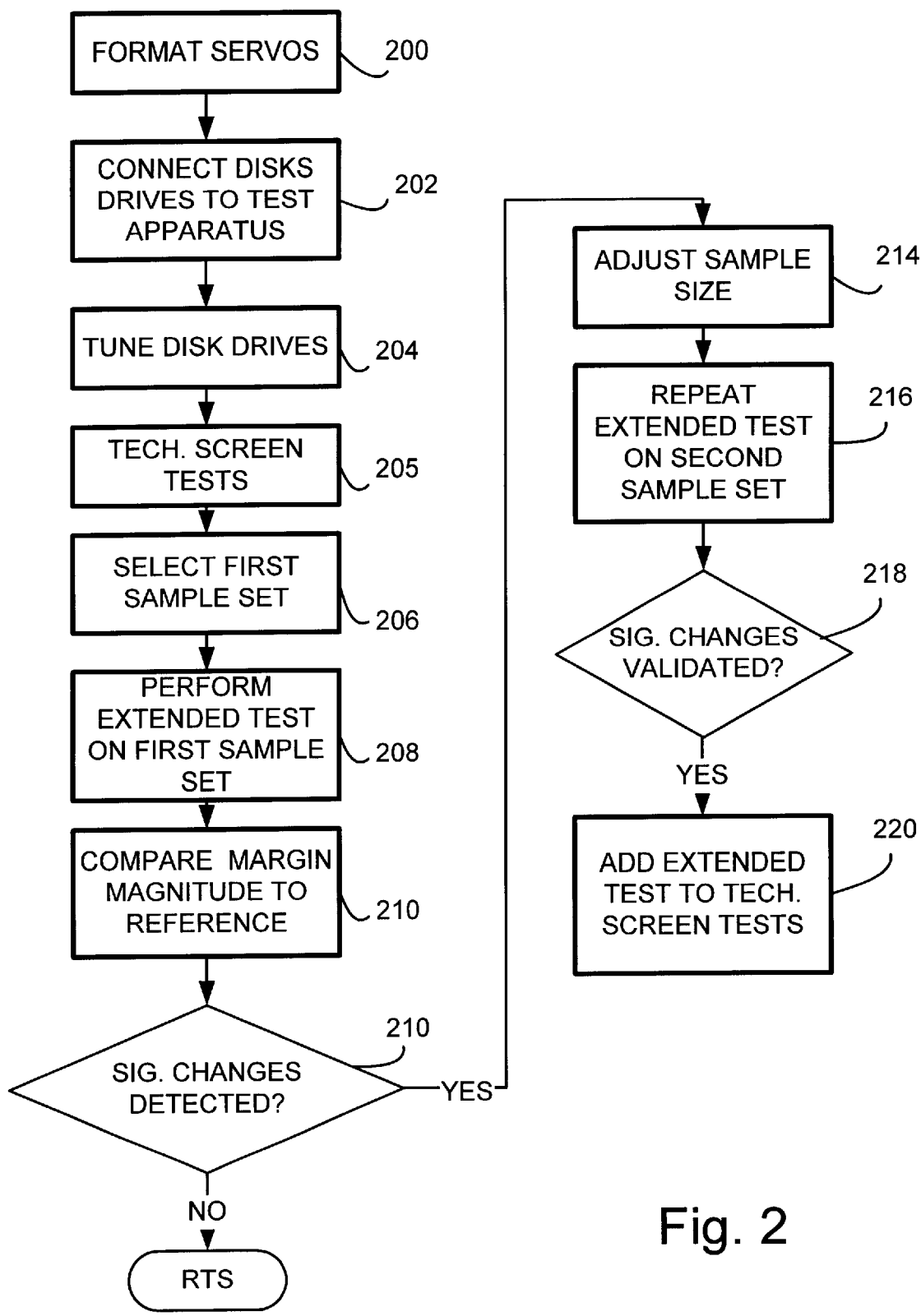
FIG. 2 is a flow diagram illustrating a method performed by the system of FIG. 1.

With reference to FIG. 2, a flow diagram illustrating a method performed by the system of FIG. 1 is shown. In a system for manufacturing disk drives 100, the disk drives having reliability attributes and manufacturing attributes 150, the manufacturing attributes 150 comprising process or component manufacturing attributes 152–154, a method for testing the reliability attributes wherein the reliability attributes comprise measurements for predicting future reliability of the disk drives 100 at the time of manufacture is disclosed. The disk drives 100 are prepared with a servo format, step 200. Each disk drive 100 is connected to the test apparatus 50, step 202. Each disk drive 100 is then tuned to verify that each disk drive performs within expected limits, step 204. The technical screen tests are performed on all disk drives, step 205. The first sample set 110 is selected automatically at the defined size using the randomizer 80, step 206. The one or more extended tests 62–64 are executed on the first sample set 110 of disk drives to measure a margin magnitude 65 for one or more of the reliability attributes, step 208. The margin magnitude 65 is then compared to the reference 66 to determine if there is a significant change 68, step 210.

If a significant change 68 is detected when comparing the margin magnitude 65 with the reference 66, step 212, then the defined size for the second sample set 112 is adjusted, step 214. The second sample set 112 is then automatically selected using the randomizer 80, step 216. The extended tests are then repeated on the second sample set 112 to validate the significant change 68, step 218. If the significant change 68 is validated, step 220, the extended test 62 that measured the significant change in margin magnitude is incorporated into the set technical screen tests 44, 46 and 62a, step 222.

In an alternative embodiment, one or more of the extended testing logic 60 or test containment logic 42 is located in the work flow system 300. Communication through the network 350 and network interface 352 provides for remote communication of data between the extended testing logic 69 or test containment logic 42 and the test apparatus 50. In this embodiment, the extended testing logic 60 or test containment logic may be applied over one or more test apparatuses 50 in the network 300.

What is claimed is:

1. A system for testing reliability attributes in disk drives, the reliability attributes comprising measurements for predicting future reliability of the disk drives at the time of manufacture, the disk drives having reliability attributes and manufacturing attributes, the manufacturing attributes comprising process or component manufacturing attributes, the system comprising:

a servo formatter for preparing each disk drive with a servo format;

a test apparatus to which each disk drive is connectable;

a calibrator for tuning each disk drive connected to the test apparatus for verifying that each disk drive performs within expected limits;

a test containment logic for performing one or more technical screen tests on each disk drive;

an extended testing logic included with the test apparatus for executing one or more extended tests on a first sample set of disk drives for measuring a margin magnitude for one or more of the reliability attributes;

the extended testing logic further for receiving selections of a first sample set of disk drives from a randomizer that automatically selects a first sample set of the disk drives, the first sample set having a defined size;

the one or more extended tests for detecting a significant change in the margin magnitude from a reference;

the extended testing logic further for automatically adjusting the defined size, and providing the adjusted defined size to the randomizer, the extended testing logic further for receiving selections of a second sample set of the disk drives from the randomizer, the second sample set having the adjusted defined size; and the extended testing logic further for repeating the extended tests on the second sample set to validate the significant change.

2. The system of claim 1, wherein the extended testing logic is further for calculating the reference for the margin magnitude by averaging historical margin magnitude data.

3. The system of claim 1, wherein the test containment logic is further for incorporating the one or more extended tests that measured the margin magnitude and detected a significant change into the technical screen tests.

4. The system of claim 1, wherein the one or more extended tests are for detecting the significant changes by detecting whether a margin magnitude for the one or more reliability attributes measure outside a numeric range from the reference margin magnitude for a selected reliability attribute, wherein the selected reliability attribute comprises a numeric value for performance of the disk drives at time of manufacture.

5. The system of claim 1, wherein the extended testing logic is adapted to provide a debug disposition depending from the reliability attribute for which a significant change was detected and validated, wherein the debug disposition comprises data suggesting that one or more manufacturing attributes should be modified.

6. In a system for manufacturing disk drives, the disk drives having reliability attributes and manufacturing attributes, the manufacturing attributes comprising process or component manufacturing attributes; a method for testing the reliability attributes, the reliability attributes comprising measurements for predicting future reliability of the disk drives at the time of manufacture, the method comprising the steps of:

preparing each disk drive with a servo format;

connecting each disk drive to a test apparatus;

tuning each disk drive connected to the test apparatus to verify that each disk drive performs within expected limits;

performing one or more technical screen tests on each disk drive;

receiving selections in a first sample set of the disk drives automatically selected by a randomizer, the first sample set having a defined size;

executing one or more extended tests on the first sample set of disk drives to measure a margin magnitude for one or more of the reliability attributes;

detecting a significant change in the margin magnitude from a reference; and automatically adjusting the defined size, providing the adjusted defined size to the randomizer, receiving selections in a second sample set of the disk drives automatically selected by the randomizer, the second sample set having the adjusted defined size; and repeating the extended tests on the second sample set to validate the significant change.

7. The method of claim 6, comprising calculating the reference for the margin magnitude by averaging historical margin magnitude data.

8. The method of claim 6, comprising incorporating the extended test that measured the margin magnitude and detected a significant change into the technical screen tests.

9. The method of claim 6, wherein the step of detecting significant changes in the one or more reliability attributes comprises detecting whether a margin magnitude for the one or more reliability attributes measures outside a numeric range from the reference, wherein the selected reliability attribute comprises a numeric value for performance of the disk drives at time of manufacture.

10. The method of claim 6, comprising providing a debug disposition depending from the reliability attribute for which a significant change was detected and validated, wherein the debug disposition comprises data suggesting that one or more manufacturing attributes should be modified.

11. The method of claim 10, comprising changing one or more component manufacturing attributes based on the debug disposition; wherein one or more defective components in one or more of the disk drives are changed.

* * * * *